United States Patent [19]

Grenet

[11] 4,344,847

[45] Aug. 17, 1982

[54] PROCESS FOR OBTAINING ENERGY, SOFT WATER AND BY-PRODUCTS FROM AQUEOUS SUBSTANCES

[76] Inventor: Edouard P. Grenet, 28, rue Bapst, 92600 Asnieres, France

[21] Appl. No.: 120,273

[22] Filed: Feb. 11, 1980

[30] Foreign Application Priority Data

Feb. 13, 1979 [FR] France ................ 79 03584
Jan. 29, 1980 [FR] France ................ 80 01882

[51] Int. Cl.$^3$ ............................................. B01D 1/00
[52] U.S. Cl. ..................................... 210/600; 60/648;
71/12; 71/64.04; 44/1 D; 44/10 A; 44/17;
204/95; 210/770; 423/475; 423/658
[58] Field of Search ............... 423/475, 658, 659;
210/600, 770; 60/648; 71/64.4, 12; 44/1 D, 10
A, 17; 204/95

[56] References Cited

U.S. PATENT DOCUMENTS

| | | | |
|---|---|---|---|
| 1,112,547 | 10/1914 | Morin et al. ........................ | 44/17 |
| 2,579,932 | 12/1951 | Kobernick ........................ | 237/12.1 |
| 2,977,214 | 3/1965 | McLellan ........................ | 71/12 |
| 3,619,142 | 11/1971 | Johnson et al. ........................ | 423/658 |
| 3,958,625 | 5/1976 | Wentorf, Jr. ........................ | 165/DIG. 17 |
| 3,965,362 | 6/1976 | Harvey ........................ | 60/648 |
| 3,967,676 | 7/1976 | Spacil ........................ | 165/DIG. 17 |
| 4,004,988 | 1/1977 | Mollard et al. ........................ | 204/95 |
| 4,019,896 | 4/1977 | Appleby ........................ | 423/DIG. 18 |
| 4,057,392 | 11/1977 | O'Donnell ........................ | 71/64.04 |
| 4,088,451 | 5/1978 | Sadan et al. ........................ | 23/295 S |
| 4,135,888 | 1/1979 | Waltrop ........................ | 44/1 D |
| 4,167,398 | 9/1979 | Hughes et al. ........................ | 44/17 |
| 4,302,297 | 11/1981 | Humiston ........................ | 60/648 |

OTHER PUBLICATIONS

Chase, "Popular Science," vol. 210, Jan. 1977, pp. 91–94.
Stepler, "Popular Science," vol. 212, Mar. 1978, pp. 20, 25 & 26.

*Primary Examiner*—Edward A. Miller

[57] ABSTRACT

The aqueous substance, for example sea water, is boiled, the steam produced is fed under pressure into a turbo-alternator turbine producing electricity, the residual steam is reduced into soft water and the residue of evaporation, for example sea salt, is recovered as a by-product.

The steam is fed directly or on leaving the turbine onto iron heated to about 800° C., which supplies hydrogen and as a by-product ferric oxide. The initial source of energy is, besides solar energy, any known source of energy, such as coal situated at great depths. The starting aqueous substance is, apart from sea water, waste sludges, a rock salt solution or a mixture of sludges and salt solution. In the case of sludges, the by-product is a dry and sterilized fertilizer transformable into fuel bricks. The salt residue is transformable by electrolysis into hydrogen and sodium chlorate, which is a fuel. The sludge-salt residue supplies a combustible mixture. Dried sludges-sodium chlorate, is mixable with household waste for promoting the combustibility thereof. The sodium chlorate can be transformed into potassium chlorate and the steam under pressure may be condensed in distant reservoirs and its heat recovered. The energies produced in the turbo alternator or fuel-by products are usable in the process.

10 Claims, No Drawings

PROCESS FOR OBTAINING ENERGY, SOFT WATER AND BY-PRODUCTS FROM AQUEOUS SUBSTANCES

BACKGROUND OF THE INVENTION

The present invention relates to a process supplying, simultaneously and under the best economic conditions, energy sources, soft water and at least one by-product, from aqueous substances and an energy source, in which the aqueous substance is brought to boiling point in a sealed enclosure provided with means for supplying the aqueous substances and means for recovering the steam and the residue from evaporation, the steam produced is fed under pressure into a turbine of a turbo-alternator for producing electricity, the water vapor leaving the turbine is condensed into soft water, for use as drinking water, water for domestic purposes, or water for sprinkling or in irrigation, and the residue of the evaporation of the aqueous substance is recovered as a by-product.

SUMMARY OF THE INVENTION

The invention consists furthermore in feeding the steam either directly or on exiting from the turbine onto a bed of subdivided iron heated to about 800° C., to reduce it partially into hydrogen which is collected; in condensing the steam, which has not been reduced after passing over the bed of iron, into soft water to be used for the above-mentioned purposes; and in using as initial energy source for heating the starting aqueous substance and the steam to be reduced, besides solar energy, any other known source of energy, even not economic coal, combustible gases, electricity, peat, combustible waste may be mentioned, this list not being limitative, and use may even be made of a source of energy unused because it is too expensive, but which becomes economic because the present process itself will provide sources of energy lowering the cost of the initial energy. By way of example, coal sources situated at great depths which are no longer worked because the cost of mining is too high, become usable and economic in the present process, as initial source of energy, since the process provides, besides energy sources, by-products having market value. Thus, in the case of coal beds situated at a depth of 800 m, if the cost of its extraction is double that of imported coal, the present process brings this price to a value equal, or even less than that of the imported coal.

It is to be noted that the containers, in which either the starting aqueous substance is heated to produce steam, or this steam is reduced to hydrogen, are heated from above, when the energy employed for this purpose is solar energy and are generally heated from below when it is another form of energy.

The said iron, which is oxidized into iron oxide, $Fe_3O_4$, is used as an oligo-element for agriculture.

If the starting aqueous substance is sea water, salt is obtained as a by-product which can be used as such, or from which elements such as sodium and magnesium may be extracted if there is excess production thereof. In this case, the process of the invention provides, besides sea salt and its constituent parts, electricity or hydrogen, or both, and soft water. Furthermore, the sea salt may be transformed by oxidization by means of known processes into sodium chlorate, $NaClO_3$, usable in the manufacture of matches and usable as a fuel in pyrotechnics. One of the known processes for oxidizing sea salt consists in electrolysis in a neutral medium providing $NaClO_3$ and hydrogen according to the reaction: $NaCl + 3 H_2O \rightarrow NaClO_3 + 3 H_2$ (see Techniques de l'Ingénieur, PARIS, France; tome Génie Chimique J6020-961 of 11-1965). The electricity required may be provided by the present process.

The starting aqueous substance may also be formed by sludges from sewarage water-purifying stations, in which case the by-product is a dry residue which has been sterilized considering the temperature and pressure conditions during boiling, and which can be used for example as dry non-polluting fertilizer. As in the preceding case, electricity and/or hydrogen and soft water are obtained simultaneously. An additional form of energy may be obtained from the sludges coming from purification which are dried and sterilized by the process and compressed into fuel bricks, as is done with coaldust, the energy for the compressers being possibly provided by the system itself.

Thus, one of the aims of the invention is an economic use of solar energy or of another source of expensive energy, considering the triple recovery (energy sources, soft water, useful by-products).

Any other aqueous substance, leaving behind by evaporation a useful or valuable residue, may be used as raw material in the present process.

Thus there may be used, as aqueous starting substance, not only sea water, but also a saline aqueous solution of rock salt, in regions where there exist beds of this salt, the surplus of which is often discharged into water courses thus polluting these latter. The solutions of rock salt will provide, in the application of the present process, sodium chlorate and hydrogen, in the same way as sea water.

It should be noted that the sodium chlorate may be transformed in a known way into potassium chlorate, by double decomposition by means of potassium chloride, according to the invention:

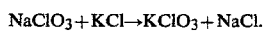

$$NaClO_3 + KCl \rightarrow KClO_3 + NaCl.$$

A potassium chlorate precipitate is obtained which has the same uses as sodium chlorate and which has furthermore applications in pharmacy. A process for preparing potassium chlorate is described in the work "Techniques de l'Ingénieur", PARIS, France, tome Génie Chimique, page J 6020-961 of the revised edition of 11-1965.

Chlorate, whether it is sodium chlorate or potassium chlorate, can be used as an industrial fuel in the following way: it is partially but sufficiently soluble in ethyl alcohol to form an equivalent of petrol for internal combustion engines, and it is soluble in mineral oils for operating, in this form, diesel engines; furthermore, it can be directly used in solid form as an oxidant for propelling rockets and it may, in this form, be mixed with any other solid combustible product or be placed in suspension in any liquid combustible product.

As starting aqueous substance sludges from water-purifying stations may be used or the waters to be purified themselves, which are salted by addition of salt water or of rock salt. In this case, the electrolysis of the residue of evaporation, consisting of brine charged with sludges and brought to a suitable salt concentration for electrolysis, supplies a mixture of sludges and sodium chlorate which, after desiccation, forms a better fuel than the dried sludges alone.

This fuel, like all the sources of energy provided by the process, may be used in the process itself. It may also be mixed with household waste, to facilitate incineration thereof, or even for using this latter as a fuel for implementing the process.

The evaporation of the starting aqueous substance in a pressure vessel may be effected by charges, with discharge and storage of the residue which, when the substance treated is salt water, may serve for supplying an electrolyser. In this case, the residue is preferably not a salty solid the salt component of which would have to be redissolved, but a concentrated brine having a sodium chloride content suitable for electrolysis. However, the electrolyser may also be said sealed enclosure itself, at the top of which the electrodes are introduced. The salt is then allowed to accumulate at the bottom of the enclosure during evaporation of the aqueous substance introduced continuously and electrolysis is proceeded with. After letting the enclosure cool down and after having filled it completely with water, so as to avoid the explosive air-hydrogen mixture, the amount of salt deposited in the enclosure is redissolved in a volume of liquid completely filling this latter, and corresponds to the desirable sodium chloride concentration for electrolysis (about 200 g/l).

For the electrolysis process, reference may also be made to the work of Faith, Keyse and Clark "Industrial Chemicals," 2nd edition, published Wiley, NEW YORK (1957), pages 665–670, the chapter entitled "Sodium chlorate obtained by electrolysis".

The containers used for implementing the process must of course resist corrosion, being for example made from galvanized iron or stainless steel or titanium steel, and they must withstand high pressures, the construction of such containers being known per se.

When the potassium chlorate is used as a fuel in engines, considering the corrosive effect of the chlorine, it is advisable to use corrosion resistant materials for the parts of the engine in contact with the fuel materials withstanding corrosion; a metal may be used lined with polytetrafluorethylene, a plastic material sold under the trademark "Teflon" for the parts where the temperature of the gases is less than 180° C., for example the exhaust pipe.

An additional advantage of the present process is that the steam collected may further be used, before being condensed to serve as soft water, for heating for industrial or domestic purposes, which represents a complementary recovery of energy.

The steam collected at the outlets of the turbine or of the container for reducing to hydrogen being still at a high pressure, of the order of 200 to 250 bars, the pipes receiving this steam must also have adequate mechanical strength. The strength required will moreover be degressive, the pressure of the steam being reduced by pressure losses as the steam travels in the piping, and this pressure allowing the steam to be fed over long distances before it condenses.

The sealed enclosure in which the aqueous substance is enclosed is advantageously a closed metal container being a good heat conductor. If solar energy is used, it is preferably black, in the case where it is desired to heat solely by the "greenhouse effect;" this is the simplest process. However, all known solar optical systems, from the simplest to the most sophisticated, can be used for concentrating the solar rays on the container. Heliostats may be used or, more practically and more inexpensively, magnifying glasses of a power preferably between 12 and 24 dioptres. An assembly of magnifying glasses may be used disposed in a cupola and crown above the container. This latter may be sealed and it is the lid thereof which is heated. The use of magnifying glasses as a cover for the container is not suitable for the steam which is then deposited thereon cancels out their effect.

The container or vessel which is made from a rust-proof metal as indicated above comprises, of course, an aqueous substance supply inlet, an outlet for the steam produced and an outlet for discharging the residue. The supply inlet is provided with a valve or cock for regulating the flow and the outlet for the steam is equipped with a pressure gauge and a safety valve opening at the desired steam pressure, which depends on the type of turbine which the steam is intended to drive for the production of electricity; it is generally the pressure of steam at about 800° C. If the steam is fed concurrently into an enclosure for catalytic reduction into hydrogen by means of iron, the same temperature of about 800° C. is required in this enclosure and is thus immediately obtained.

The pump used for supplying the container with aqueous substance, as well as that used for pumping the soft water produced into the user pipes, may be a solar pump, for example sold by the firm Etablissements Defontaine, Nantes, France. The use of a solar pump is more rational, when the container is itself heated by solar energy, the water supply having to correspond with the production of steam, itself depending on the amount of sunshine. Furthermore, that avoids consuming another form of energy, the aim being to produce energy. A part of the energy produced by the process may also be used for supplying the pumps, this energy having different forms, as indicated above (electricity, hydrogen, sodium chlorate). The turbine is of a type known per se, adapted for recovery of the steam at its outlet.

This steam is either condensed into soft water, or fed into the reduction enclosure, which is another sealed and heat-conducting metal container containing iron heated to at least 800° C., by solar energy, or any other form of energy. By reduction on iron, about 8% combined hydrogen is recovered which is contained in the water vapor. The non-dissociated water leaving this second container is condensed into soft water.

Considering the sources of energy which the process supplies, it is of course possible to continue heating the aqueous substance, for example when solar energy is lacking (during the night) or is insufficient (depending on the atmospheric conditions and the seasons), or for economizing any other source of energy to which recourse is had, by using said sources of energy supplied (electricity and hydrogen, when the aqueous substance treated is sea water or a rock salt solution; electricity, hydrogen and fuel bricks of dried sludges, when the aqueous substance treated is the sludge from water purification stations).

We saw above the possible uses of the soft water recovered. Particularly in regions where there is sunshine, which it is suitable to use as an energy source, but where water is lacking, the water recovered may be bottled as drinking water, stored in reservoirs for domestic use and for spreading over arid soils. If the steam recovered is still under pressure, that facilitates its feeding through underground piping to distant reservoirs. As far as the economic aspect of the process is concerned, there is a close correspondence between the investments in equipment and the yield of the process. Thus, if it is only desired, and this depending on the amount of sunshine, to extract salt from sea water, or to sterilize sludges from water purification, while producing electricity and while collecting soft water, it will suffice to use the greenhouse effect, or preferably this effect improved by a system of magnifying glasses, which is inexpensive. If it is desired in addition to produce hydrogen, when the amount of sunshine is sufficient for this production, use must be made of other more expensive optical systems, considering the high temperature to be reached in the reduction container. The amortizement of the equipment is increased thereby, but also the efficiency of the process.

DESCRIPTION OF A PREFERRED EMBODIMENT OF THE INVENTION

As starting substance, sea water containing 20 to 30 g/l of sodium chloride is used and as initial energy source coal is used.

The sea water is heated in a sealingly closed container withstanding corrosion and pressure and heated from below. This container has in its upper part in orifice to which piping is connected for feeding in sea water and an orifice to which is connected piping for discharging the steam produced; the first piping is provided with a valve or cock and the second piping is provided with a pressure gauge and is closed by a valve, which only opens under the effect of pressure corresponding to the pressure of steam at 800° C. At the base of the container there is connected a pipe provided with a valve or cock for discharging the residual concentrated brine.

Operation is by batches and the evaporation is stopped and the residual brine drawn off when this latter has a sodium chloride concentration of about 200 g/l, which is that usually used for electrolysis providing sodium chlorate and hydrogen. The concentrated residual brines are gathered together and stored, which will serve for supplying an electrolyser, which will be operated at about 70° C. for the production, in a way known per se, of sodium chlorate and hydrogen. On leaving the electrolyser, the solution contains about 500 g/l of sodium chlorate and 100 g/l of sodium chloride; it is fed into reservoirs which are cooled by brine at about −10° C.; the sodium chlorate precipitates; the suspension of the precipitate is drawn off discontinuously from the cooling reservoirs, the sodium chlorate is then separated, washed and dried and the residual solution, containing 300 g/l of sodium chlorate and 100 g/l of sodium chloride is recycled in the electrolyser, after having been enriched in sodium chloride by means of the concentrated residual brine resulting from the evaporation of sea water.

In a variation, the evaporation container may also itself serve periodically as electrolyser, in which case it is provided at its top with an additional outlet with piping for discharging the hydrogen, the lower outlet being then used for discharging the sodium chlorate solution. The two electrodes are introduced through the top of the container. Evaporation is carried out by continuously supplying the container with salt water, until the deposit of sodium chloride at the bottom of the container is sufficient for the dissolution of this salt in a volume of water completely filling the recipient to supply brine at about 200 g/l of sodium chloride. Electrolysis is carried out after cooling of the container to the required temperature of about 70° C.

The steam discharge at 800° C. during the evaporation phase is fed, concurrently, into a turbo-alternator turbine and into a reduction container, sealingly closed and withstanding corrosion and pressure. This container contains iron, which is oxidized into ferric hydroxide whereas a part of the steam is reduced to hydrogen, which escapes with the non-reduced steam through an orifice provided at the top of the reduction container and to which is connected piping for recovering the gas and the steam, this latter being separated and recovered by condensation.

On leaving the turbine, the steam is at a pressure between 200 and 250 bars. It may be immediately cooled to condense it into soft water, or else its pressure may be used for feeding it to be condensed in reservoirs situated a great distance away, and its heat is preferably recovered for industrial or domestic heating, during its cooling.

These operations supply therefore, as sources of energy, electricity at the output of the turbo-alternator, sodium chlorate and hydrogen resulting from the electrolysis, and hydrogen resulting from the reduction of the steam.

As for the by-products, these are ferric oxide from the reduction of the steam and usable as an oligo-element in agriculture, sea salt and the chemical elements which it contains, if part of the salt is collected without electrolyzing it, and soft water from the condensation of the steam.

It will be understood in this case that the initial source of energy for implementing the process may be coal situated at a depth such that its working has been abandoned, but may be taken up again and becomes economic in the particular case considered.

Of course, all the sources of energy produced may, after the process has been started up, replace coal, for heating the evaporation container and the reduction container; these energies can also be used for driving the pump supplying the evaporation container, the one pumping the soft water produced into the user piping and all the other pumps and in general all the motors whose use may be necessary in the process.

It is apparent that within the scope of the invention, modifications and different arrangements can be made other than are here disclosed. The present disclosure is merely illustrative with the invention comprehending all variations thereof.

What is claimed is:

1. A process for the purification of water which comprises the steps of (a) introducing the water source to be purified into a pressure vessel, provided with vapor duct means and residue recovery means; (b) heating said vessel to vaporize the water content from said source while pressurizing same; (c) feeding, via said duct means, at least a fraction of said pressurized water vapor into contact with a bed of iron at about 800° C. to reduce some of the contact water vapor to hydrogen; (d) separating and collecting the generated hydrogen; (e) removing the residue from said pressure vessel via said recovery means; (f) expanding the unreacted water vapor through a turbine-generator to generate electrical energy; (g) utilizing and recovering said generated energy; and (h) condensing the water vapor to pure liquid water.

2. The process according to claim 1 wherein said water sources are saline solutions and effluent from sewage-water treatment plants and mixtures thereof.

3. The process according to claim 2, wherein the solid residues from said saline solutions are oxidized to chlorates by the electrical energy generated by expanding the pressurized water vapor in said turbine-generators.

4. The process according to claim 2 wherein the solid organic residue from said effluent water sources is dried.

5. The process according to claim 4 wherein said dried residue is compacted into briquets.

6. The process according to claim 4 wherein said dried residue is converted to agricultural fertilizer granules.

7. The process according to claim 2 wherein the concentrated residue from said mixed sources is electro-oxidized by said electrical energy from said turbogenerator to form a mixture of oxidized states of the salt-components of said mixture with the organic sewage effluent residues from said mixture; drying said mixed residue; compacting said dried residue into bricks and utilizing some of said bricks comprising the organic residues and oxidized salts as fuel for heating said vessel and/or said contacted iron.

8. The process according to claim 2 wherein the saline solutions are sea-water, brackish water, leached salt solutions from mineral sources and mixtures thereof.

9. The process according to claim 5 wherein the sodium chloride residues from said sources is electro-oxidized by the electrical energy from said turbo-generator to oxidized forms including sodium chlorates and then converting same to potassium chlorate by reaction with potassium chloride.

10. The process according to claim 1 wherein at least a portion of the generated and separated hydrogen is burned to provide at least a portion of the energy for heating said pressure vessel and/or said bed of iron.

* * * * *